United States Patent
Takahashi

(10) Patent No.: US 9,277,117 B2
(45) Date of Patent: Mar. 1, 2016

(54) ELECTRONIC APPARATUS INCLUDING A TOUCH PANEL AND CONTROL METHOD THEREOF FOR REDUCING ERRONEOUS OPERATION

(71) Applicant: CANON KABUSHIKI KAISHA, Tokyo (JP)

(72) Inventor: Ryo Takahashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 66 days.

(21) Appl. No.: 14/138,839

(22) Filed: Dec. 23, 2013

(65) Prior Publication Data

US 2014/0184868 A1  Jul. 3, 2014

(30) Foreign Application Priority Data

Dec. 27, 2012  (JP) ................................ 2012-285994

(51) Int. Cl.
- H04N 5/222 (2006.01)
- H04N 5/232 (2006.01)
- H04N 9/04 (2006.01)

(52) U.S. Cl.
CPC ....... *H04N 5/23222* (2013.01); *H04N 5/23216* (2013.01); *H04N 5/23293* (2013.01)

(58) Field of Classification Search
USPC ............ 348/333.01, 333.02, 333.12; 715/863
See application file for complete search history.

(56) References Cited

U.S. PATENT DOCUMENTS

| | | | | |
|---|---|---|---|---|
| 7,085,590 | B2* | 8/2006 | Kennedy | G06F 1/1626 348/E7.079 |
| 7,430,008 | B2* | 9/2008 | Ambiru et al. | 348/333.12 |
| 8,217,904 | B2* | 7/2012 | Kim | G06F 3/0481 345/173 |
| 8,648,931 | B2* | 2/2014 | Chuang et al. | 348/231.3 |
| 8,830,191 | B2* | 9/2014 | Papakipos et al. | 345/173 |
| 8,964,091 | B2* | 2/2015 | Chun | H04N 5/23216 348/333.01 |
| 2009/0295753 | A1* | 12/2009 | King et al. | 345/174 |
| 2011/0032202 | A1* | 2/2011 | Aoyagi | G06F 1/1626 345/173 |
| 2011/0193984 | A1* | 8/2011 | Kitaya et al. | 348/222.1 |
| 2013/0010169 | A1* | 1/2013 | Tochio | H04N 5/23212 348/333.01 |
| 2013/0128078 | A1* | 5/2013 | Song | H04N 5/2251 348/231.99 |
| 2014/0006985 | A1* | 1/2014 | Matsushima | G06F 3/04883 715/765 |
| 2014/0184867 | A1* | 7/2014 | Sudo | G06F 3/0488 348/333.01 |

FOREIGN PATENT DOCUMENTS

| | | |
|---|---|---|
| JP | 10-207633 A | 8/1998 |
| JP | 2011-039989 A | 2/2011 |

\* cited by examiner

*Primary Examiner* — Ngoc-Yen Vu
(74) *Attorney, Agent, or Firm* — Cowan, Liebowitz & Latman, P.C.

(57) ABSTRACT

Control is made in such that in a case where an attitude detected by an attitude detection unit is a first attitude, if a trace of a detected touched position satisfies a specific condition, a function corresponding to the detected trace is executed, and in a case where the detected attitude is a second attitude opposite to the first attitude, even if the trace of the detected touched position is a trace which satisfies the specific condition, the corresponding function is not executed. Thus, when an electronic apparatus is upside-down, a specific gesture operation by a touch operation is invalidated.

14 Claims, 14 Drawing Sheets

| GESTURE ID | TRACE | FUNCTION |
|---|---|---|
| A |  | VIEW PREVIOUS IMAGE |
| B |  | VIEW NEXT IMAGE |
| C |  | ADD TO FAVORITE |
| D |  | GIVE PROTECTION |
| E |  | ENLARGE IMAGE |

ELECTRONIC APPARATUS INCLUDING A TOUCH PANEL AND CONTROL METHOD THEREOF FOR REDUCING ERRONEOUS OPERATION

BACKGROUND OF THE INVENTION

1. Field of the Invention

The present invention relates to an electronic apparatus having a touch panel and a technique suitable for use in a control method of the electronic apparatus.

2. Description of the Related Art

In recent years, many mobile equipment and tools each having a large touch panel exist. Among such mobile equipment and tools, there are many equipment and tools in which a GUI display image displayed on a display rotates in accordance with an attitude of the equipment. For example, in the case of a rectangular display, while Web browsing will be easier to be viewed in case of a vertical positional state, in the case of viewing a movie or the like, it is desirable to view an image in a lateral positional state.

Recent mobile equipment and tools are arranged to rotate a GUI display image in accordance with an attitude for such a use described above. In mobile equipment or tool having a liquid crystal display of a tilt type, particularly, in a digital camera or the like, there is a case where a high-angle shot happens to take place depending on a photographing scene. In such a situation, photographing takes place in such a manner that the camera may be turned over by 180 degrees (held upside down) so that the liquid crystal display of the tilt type is opened by 90 degrees.

The Official Gazette of Japanese Patent Application Laid-Open No. H10-207633 proposes such a technique that even if a relative orientation of the user and the touch panel changes, an operation feeling of the user remains being unchanged. Specifically speaking, there has been proposed such a technique that if the orientation of the touch panel for the user is changed, a display origin is changed so that a displayed item is rotated and displayed, an origin of a touch-input is changed, and a touch position is converted into coordinates based on the changed origin.

The Official Gazette of Japanese Patent Application Laid-Open No. 2011-039989 proposes such a technique that in a digital camera having a touch panel, if it is determined that a movement of a touch on the touch panel is a predetermined trace (serving as a gesture), a function assigned to the determined trace is executed.

According to the method proposed in the Official Gazette of Japanese Patent Application Laid-Open No. H10-207633, at a position to which a monitor is rotated by 180 degrees, since the GUI display image (for example, a member such as an icon which can be touched by the user or the like) is also reversed vertically and horizontally (rotated by 180 degrees), a visibility is enhanced and the user can operate easier. However, according to such a method, in the case where the mobile equipment is, for example, a digital camera, if it is held upside down, there is a possibility that when the user confirms an image at the time of a rec review after photographing, the user happens to perform an erroneous operation is performed. Note that "rec review" denotes such a processing that in order to confirm the photographed image, after an object is photographed and before the object image is recorded into a recording medium, image data is displayed to an image display unit only for a predetermined time (review time).

For example, while the touch panel of each of the recent mobile equipment and tools gets larger, since a grip portion is smaller compared with the whole surface area, if the trace of the operation by the touch as disclosed in the Official Gazette of Japanese Patent Application Laid-Open No. 2011-039989 or the like is performed, a grasping hand becomes unstable and there is such a risk that the camera is dropped. The recent mobile equipment and tools are not equipped with a device which detects such a risk and inhibits the operation in the upside-down state.

Since a hand which grips changes in dependence on a camera shape, the finger which is used to perform the touching operation is reversed, and if the trace of the operation by the touch as disclosed in the Official Gazette of Japanese Patent Application Laid-Open No. 2011-039989 Patent Literature 2 is permitted, there is such a risk that the camera is dropped in the case where the user is not familiar with handling the camera.

SUMMARY OF THE INVENTION

In consideration of the foregoing problems, it is an aspect of the invention to provide an electronic apparatus which can reduce a risk of an erroneous operation or a drop and can attain the stable touching operation even in the case where an electronic apparatus having a touch panel is held upside down, a control method of the electronic apparatus, a program, and a recording medium thereof.

According to an aspect of the invention, an electronic apparatus comprising: an attitude detection unit; a touch detection unit; and a control unit configured to control in such a manner that in a case where an attitude detected by the attitude detection unit is a first attitude, if a trace of a position of the touch detected by the touch detection unit satisfies a specific condition, a function corresponding to the detected trace is executed, and in a case where the attitude detected by the attitude detection unit is a second attitude opposite to the first attitude, even if the trace of the position of the touch detected by the touch detection unit is a trace which satisfies the specific condition, the corresponding function is not executed.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the present invention will be described in detail below with reference to the drawings.

Figure 1A:
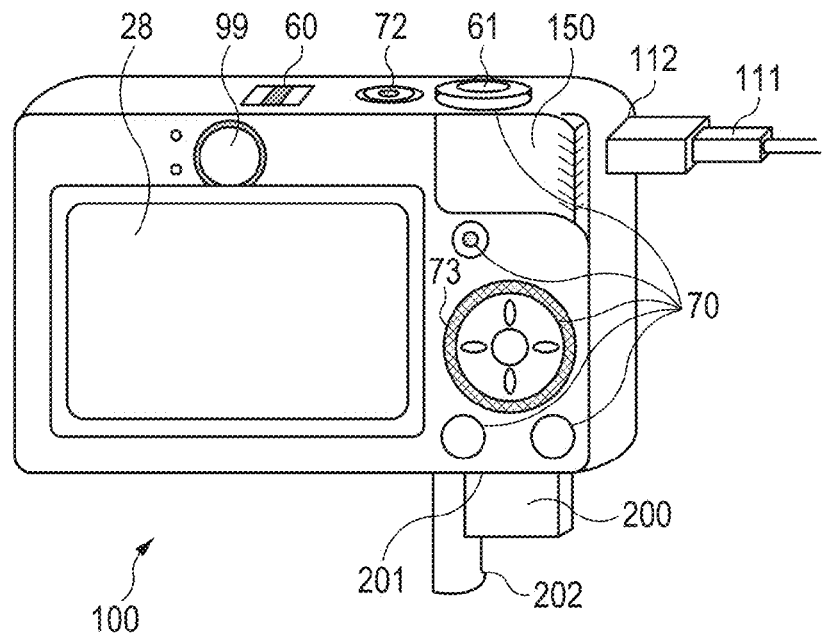
FIGS. 1A and 1B are diagrams illustrating an example of an external appearance of an image pickup apparatus having a display unit.

An external view of a digital camera 100 as an example of an image pickup apparatus of the invention is illustrated in FIG. 1A. In FIG. 1A, a display unit 28 displays an image and various kinds of information. The display unit 28 is constructed by a touch panel and can detect a touching to the display unit 28.

A shutter button 61 is an operation unit to instruct a photographing. A mode change-over switch 60 is an operation unit to change over various kinds of modes. A connector 112 is provided to connect a connecting cable and the digital camera 100. An operation unit 70 is constructed by operation members such as various kinds of switches for receiving various kinds of operations from the user, buttons, a touch panel, and the like.

A controller wheel 73 is a rotatable operation member included in the operation unit 70. A power supply switch 72 is used to change over a power-on and a power-off. A recording medium 200 is a memory card, a hard disk, or the like. A recording medium slot 201 is provided to insert the recording medium 200. The recording medium 200 inserted into the recording medium slot 201 can communicate with the digital camera 100. A cover 202 is provided to cover the recording medium slot 201.

Figure 1B:
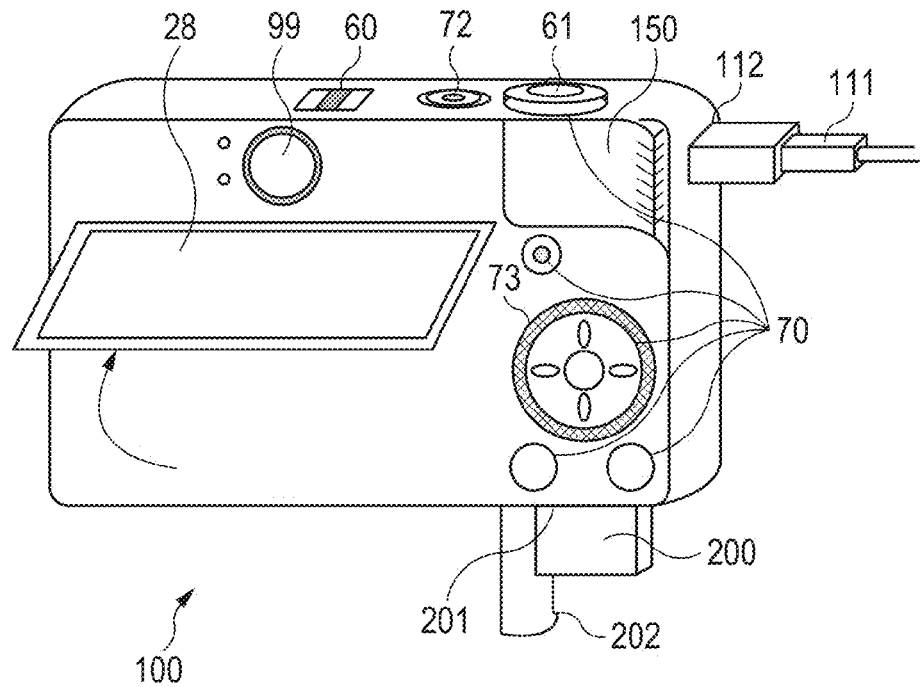

FIG. 1B illustrates a diagram in the case where the display unit 28 has a display of the tilt type and a display portion is opened by 90 degrees. The user can manually and freely open and close such a display in accordance with a photographing style. Particularly, in the case where a high-angle shot is performed or the like, it is presumed that the digital camera 100 is held upside down in a state where the display unit 28 is opened by 90 degrees.

Figure 2:
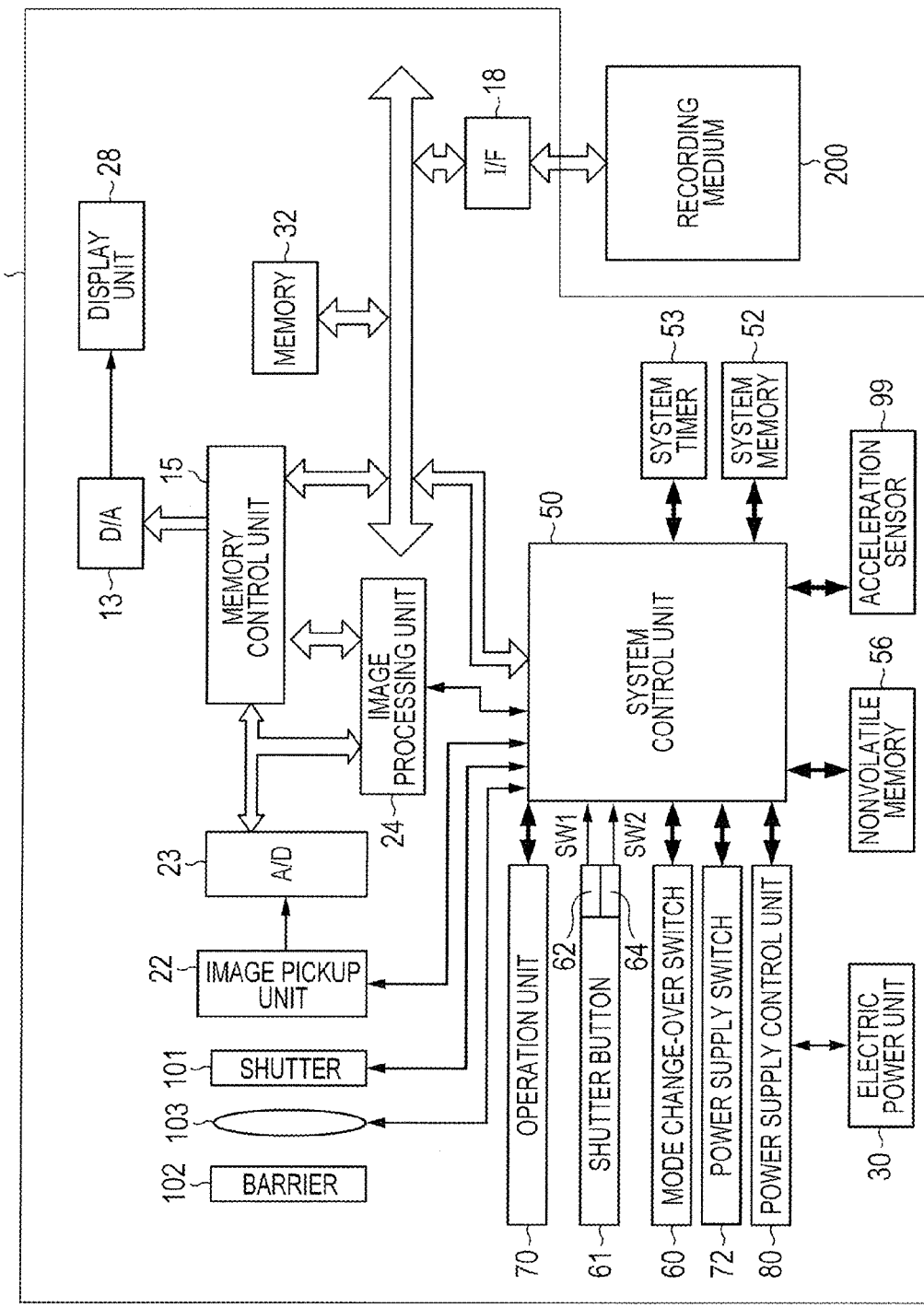
FIG. 2 is a block diagram illustrating an example of a hardware construction of the image pickup apparatus.

FIG. 2 is a block diagram illustrating an example of a construction of the digital camera 100 according to the embodiment.

In FIG. 2, a photographing lens 103 includes a focus lens. A shutter 101 has an iris function. An image pickup unit 22 is constructed by a CCD, a CMOS element, or the like for converting an optical image into an electric signal. An A/D converter 23 converts an analog signal into a digital signal. The A/D converter 23 is used to convert an analog signal which is output from the image pickup unit 22 into a digital signal. A barrier 102 covers an image pickup unit (of the digital camera 100) including the photographing lens 103, thereby preventing a dirt or damage of an image pickup system including the photographing lens 103, shutter 101, and image pickup unit 22.

An image processing unit 24 executes a resizing processing such as a predetermined pixel interpolation or reduction and a color conversion processing to data from the A/D converter 23 or data from a memory control unit 15. In the image processing unit 24, a predetermined arithmetic operation processing is executed by using data of the photographed image. A system control unit 50 executes exposure control and distance measurement control on the basis of an obtained result of the arithmetic operation.

Thus, an AF (Auto-Focus) process of a TTL (Through-The-Lens) method, an AE (Auto-Exposure) process, and an EF (flash light pre-emitting) process are executed. In the image processing unit 24, a predetermined arithmetic operation processing is further executed by using the data of the photographed image and an AWB (Auto-White Balance) process of the TTL method is also executed on the basis of an obtained result of the arithmetic operation.

Output data from the A/D converter 23 is written into a memory 32 through the image processing unit 24 and the memory control unit 15 or is directly written into the memory 32 through the memory control unit 15. The memory stores the image data which is obtained by the image pickup unit 22 and converted into the digital data by the A/D converter 23 and the image data to be displayed onto the display unit 28. The memory 32 has a storage capacity enough to store a predetermined number of frames of still images and a moving image and audio sound of a predetermined time. If the photographed image data is successively displayed by using the display unit 28, an electronic viewfinder (through-image display) can be realized.

The memory 32 also functions as a memory for an image display (video memory). A D/A converter 13 converts the image displaying data stored in the memory 32 into an analog signal and supplies to the display unit 28. The image displaying data written in the memory 32 is displayed by the display unit 28 through the D/A converter 13. The display unit 28 displays an image onto the display such as an LCD or the like in accordance with the analog signal from the D/A converter 13.

A nonvolatile memory 56 is an electrically erasable and recordable memory and, for example, an EEPROM or the like is used. Constants, a program, and the like for making the system control unit 50 operative are stored in the nonvolatile memory 56. Note that "program" mentioned here denotes a program to execute various kinds of flowcharts, which will be described hereinafter, in the embodiment.

The system control unit 50 controls the whole digital camera 100. By executing the program recorded in the foregoing nonvolatile memory 56, each processing of the embodiment, which will be described hereinafter, is realized. A RAM is used as a system memory 52. Constants and variables for making the system control unit 50 operative, the program which is read out of the nonvolatile memory 56, and the like are developed in the system memory 52. The system control unit 50 also controls the display by controlling the memory 32, D/A converter 13, display unit 28, and the like.

The mode change-over switch 60, a first shutter switch 62, a second shutter switch 64, and the operation unit 70 are operation units for inputting various kinds of operation instructions to the system control unit 50. The mode change-over switch 60 switches the operation mode of the system control unit 50 to one of the photographing mode in which the still image and moving image can be recorded, the reproduction mode, and the like.

The first shutter switch 62 is turned on during the operation of the shutter button 61 provided for the digital camera 100, that is, in what is called a half depression (photographing preparation operation instruction) and generates a first shutter switch signal SW1. With the first shutter switch signal SW1, the operations such as AF (Auto-Focus) process, AE (Auto-Exposure) process, AWB (Auto-White Balance) process, EF (flash light pre-emitting) process, and the like (at least one of them is called a photographing preparation operation hereinbelow) are started. Those processes are executed under control of the system control unit 50.

The second shutter switch 64 is turned on by completion of the operation of the shutter button 61, that is, in what is called a full depression (photographing instruction) and generates a second shutter switch signal SW2. With the second shutter switch signal SW2, the system control unit 50 starts the operations of a series of photographing processings to be performed from the read-out of the signal from the image pickup unit 22 to the writing of the image data into the recording medium 200.

Functions are properly assigned every scene to the operation members of the operation unit 70 by a method whereby various kinds of function icons displayed on the display unit 28 are selected or the like, so that the operation members function as various kinds of function buttons, respectively. Function buttons, for example, may be an "end" button, a "back" button, an "image-feed" button, a "jump" button, a "narrow-down" button, an "attribute-change" button, and the like. For example, when a "menu" button is pressed, various kinds of settable menu screens are displayed on the display unit 28. The user can intuitively make various kinds of settings by using the menu screen displayed on the display unit 28, 4-directionally operative buttons, and an SET button. The controller wheel 73 is a rotatable operation member included in the operation unit 70 and is used when selection items are instructed together with the directionally operative buttons, or the like.

A power supply control unit 80 is constructed by a battery detection circuit, a DC-DC converter, a switch circuit for switching a block to be turned on, and the like and detects the presence or absence of a battery which is put, a type of battery, and a battery residual capacity. On the basis of a result of the detection and instructions from the system control unit 50, the power supply control unit 80 controls the DC-DC converter and supplies a necessary voltage to each unit including the recording medium 200 for a necessary period of time.

An electric power unit 30 is constructed by a primary battery such as alkaline battery, lithium battery, or the like, a secondary battery such as NiCd battery, NiMH battery, Li battery, or the like, an AC adaptor, and the like. An interface 18 is provided as an interface of the recording medium 200 such as memory card, hard disk, or the like. The recording medium 200 is a recording medium such as a memory card or the like and is constructed by a semiconductor memory, a magnetic disk, or the like.

An acceleration sensor 99 is a sensor which can detect the attitude of the digital camera 100 with reference to the gravitational direction. The acceleration sensor 99 is used for an attitude detection processing for notifying the system control unit 50 of the detected attitude. On the basis of information of the attitude detection, the system control unit 50 can discriminate whether or not the digital camera is held at a normal position or an upside-down position.

As one of the operation members of the operation unit 70, a touch panel (touch operation member) which can detect the touching operation to the display unit 28 is provided. The touch panel and the display unit 28 can be integratedly constructed. For example, the touch panel is constructed so that transmissivity of light does not obstruct the display of the display unit 28. The touch panel is attached to an upper layer of the display surface of the display unit 28. Input coordinates on the touch panel are made to correspond to display coordinates on the display unit 28. Thus, such a GUI that the user can operate as if he or she could directly operate the screen displayed on the display unit 28 can be constructed.

The system control unit 50 can perform the touch detection for detecting the following operations to the touch panel. That is, the touch panel is touched by a finger or pen (hereinbelow, referred to as "touch-down"). The touch panel is in a state where it is touched by the finger or pen (hereinbelow, referred to as "touch-on"). The touch panel is being moved in a state where it is touched by the finger or pen (hereinbelow, referred to as "touch-move"). The finger or pen which is in touch with the touch panel is detached (hereinbelow, referred to as "touch-up"). A state where nothing is in touch with the touch panel (hereinbelow, referred to as "touch-off").

Those operations and the coordinates of the position where the finger or pen is in touch with the touch panel are notified to the system control unit 50 through an internal bus 111. On the basis of the notified information, the system control unit 50 discriminates what kind of operation is performed onto the touch panel. With respect to "touch-move", the moving direction of the finger or pen which is moved on the touch panel can be also discriminated every vertical/horizontal component on the touch panel on the basis of a change in position coordinates. In a case where predetermined "touch-move" is performed after "touch-down" is performed on the touch panel and, subsequently, "touch-up" is performed, the finger or pen is considered to have drawn a stroke. The operation for rapidly draw a stroke is called "flick".

Note that "flick" denotes such an operation that in a state where the finger is in touch with the touch panel, the finger is rapidly moved by a certain distance and is detached. In other words, "flick" denotes such an operation that the finger quickly rubs the touch panel as if it is flipped by the finger. When such an operation that the finger is moved by a predetermined distance or longer at a predetermined speed or higher is detected and "touch-up" is detected as it is, it may be determined that "flick" is performed.

It is assumed that in a case where such an operation that the finger is moved by the predetermined distance or longer at a speed lower than the predetermined speed is detected, it is decided that "drag" is performed. Such an operation that one arbitrary point on the display screen is lightly hit (press & release) is called "single-touch". Such an operation that one arbitrary point on the display screen is continuously and lightly hit twice (two sets of press & release are repeated) is called "double-touch".

The foregoing operations of "flick", "drag", "single-touch", and "double-touch" are operations which are executed in the case where the finger or pen is in touch at one point on the touch panel. The operations which are executed in the case where the finger or pen is in touch at a plurality of points on the touch panel will be described hereinbelow.

Note that "pinch" denotes such an operation that an image is grabbed by two fingers or pens. Also note that "pinch-in" denotes such an operation that two fingers or pens are put onto the touch panel and an interval between them is narrowed. On the contrary, "pinch-out" denotes such an operation that two fingers or pens are put onto the touch panel and the interval between them is widened.

In recent years, generally, enlargement control of the displayed image is performed by using "pinch-out" and reduction control of the displayed image is performed by using "pinch-in". In the embodiment, an intermediate point in the "pinch" state, that is, in the case where "touch-down" is performed to two points is called "pinch center point".

As a touch panel, any one of the following various types of touch panels may be used: a resistance film type; an electric capacity type; a surface acoustic type; an infra-ray type; an electromagnetic induction type; an image recognition type; a photosensor type; and the like. The system control unit 50 in the present embodiment controls the whole operation of the apparatus in such a manner that when a trace detection to detect a touched trace is performed, a function corresponding to the detected trace is executed.

Figure 3:
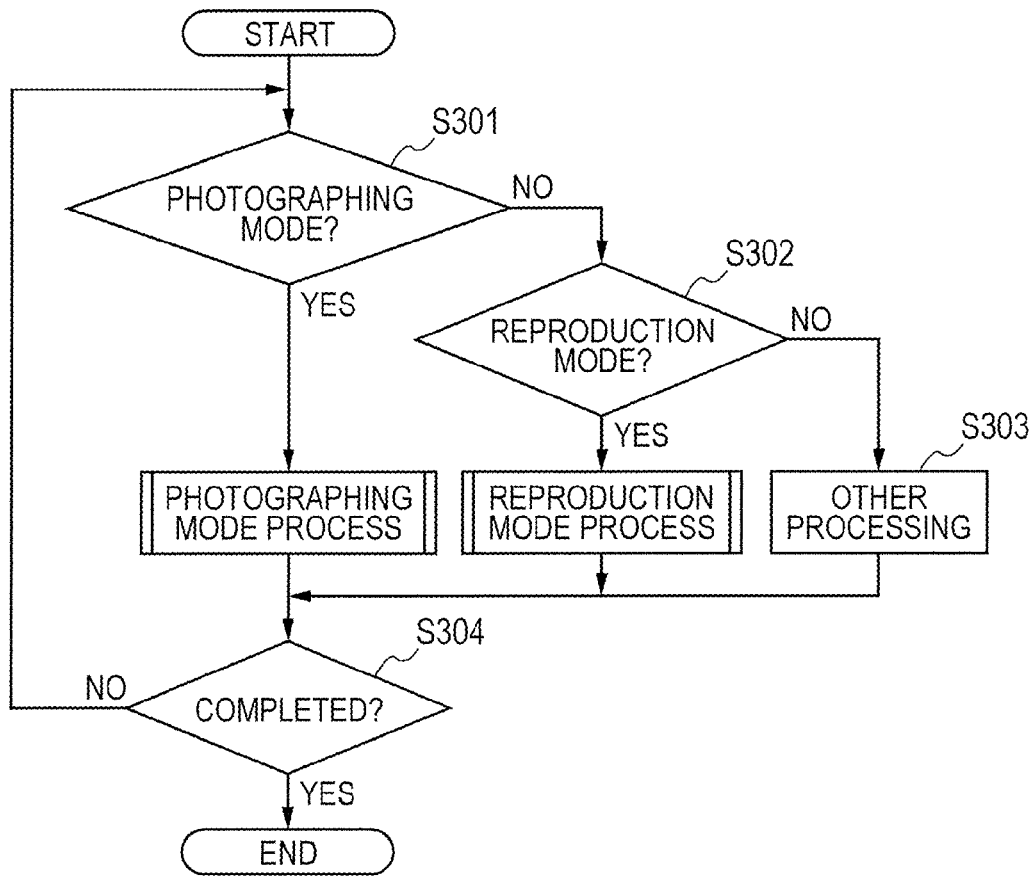
FIG. 3 is a flowchart illustrating a fundamental processing to be performed from an activation of a digital camera to a completion thereof.

FIG. 3 is a flowchart illustrating a fundamental flow of an operation to be performed from an activation of the digital camera 100 to an end thereof. This flowchart is realized by a method whereby the program recorded in the nonvolatile memory 56 is developed into the system memory 52 and the system control unit 50 executes it.

After the camera is activated, the processing routine advances to S301.

In S301, whether or not the operation mode is the photographing mode is discriminated on the basis of the position of the mode change-over switch 60. If it is determined that the operation mode is the photographing mode, a photographing mode process is executed. If it is determined that the operation mode is not the photographing mode, S302 follows. The photographing mode process will be described in detail in the first embodiment, which will be described hereinafter.

In S302, whether or not the operation mode is the reproduction mode is discriminated on the basis of the position of the mode change-over switch 60. If it is determined that the operation mode is the reproduction mode, a reproduction mode process is executed. If it is determined that the operation mode is not the reproduction mode, S303 follows. The reproduction mode process will be described in detail in the second embodiment, which will be described hereinafter. In S303, other processing is executed. As "other processing" mentioned here, a processing in a time displaying mode in which the current time is merely displayed or the like can be mentioned. After completion of each mode process, the processing routine advances to S304 and whether or not the camera operation is shut down is discriminated. If it is determined that the camera operation is shut down, the camera operation is completed. If the camera operation is not shut down, the processing routine advances to S301.

Figure 4A:
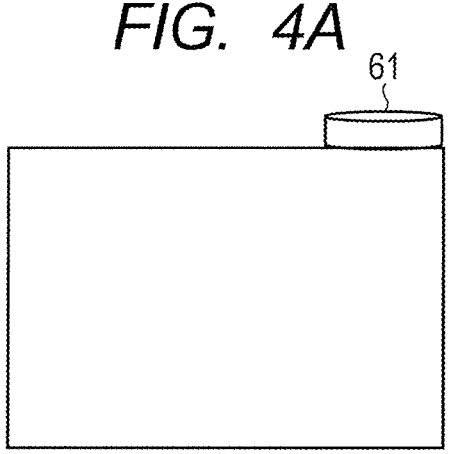
FIGS. 4A and 4B are simple diagrams of the image pickup apparatus in a state of a normal position attitude and a state of an upside-down attitude.
Figure 4B:
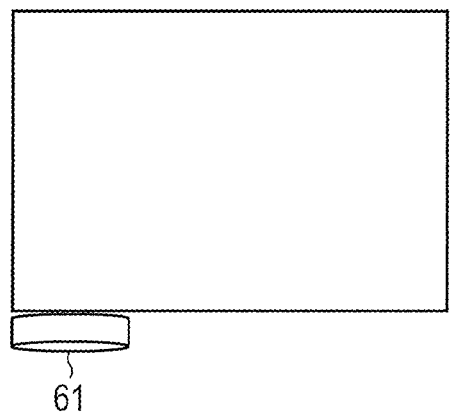

FIG. 4A illustrates a schematic diagram in the case where the digital camera 100 is held at a normal position. That is, a case where the shutter button 61 illustrated in FIGS. 1A and 1B is located at the upper right position is assumed to be a normal position. FIG. 4B illustrates a schematic diagram in the case where the digital camera 100 is held upside down. That is, a case where the shutter button 61 illustrated in FIGS. 1A and 1B is located at the lower left position is assumed to be an upside-down position. It is assumed that the diagrams which will be used for description hereinbelow are based on the schematic diagrams of FIGS. 4A and 4B.

Prior to describing the embodiment of the invention, the photographing mode suitable for the invention will be described. Note that a photographing mode in this instance is named as a multi-shot mode.

Figure 5:
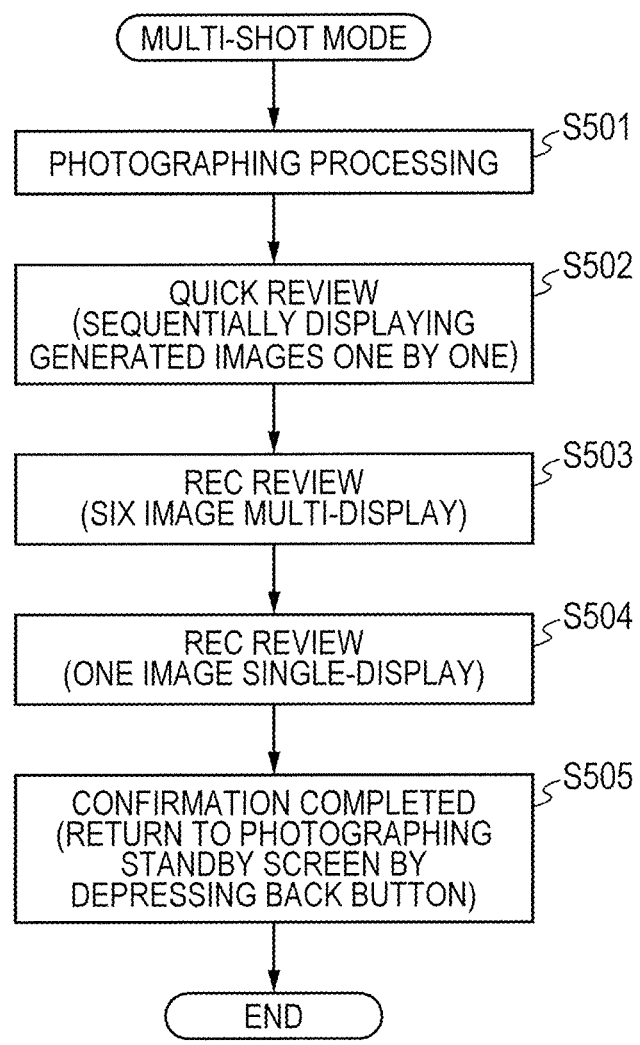
FIG. 5 is a flowchart illustrating a schematic processing of a multi-shot mode.

FIG. 5 is a flowchart for describing the multi-shot mode. Specifically speaking, FIG. 5 is the flowchart illustrating an operation processing to be performed from the photographing and "rec review" to a state where the display screen is returned to a photographing standby screen. This flowchart is realized by a method whereby the program recorded in the nonvolatile memory 56 is developed into the system memory 52 and the system control unit 50 executes it.

Figure 6A:
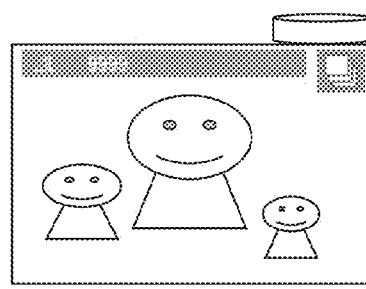
FIGS. 6A, 6B, 6C and 6D are diagrams illustrating a display unit in a photographing standby state in the multi-shot mode, a display unit during the photographing in the multi-shot mode, a display unit during a rec review in the multi-shot mode (multi-display), and a display unit during the rec review in the multi-shot mode (single-display and an image feed).

First, the user executes a photographing processing in S501. When the user presses the shutter button 61, the shutter is turned on three times by one depressing operation and three RAW images are formed in the memory. By a post processing after the photographing, six images are finally formed from the three RAW images and stored into the nonvolatile memory 56. A state of the display unit 28 before photographing is illustrated in FIG. 6A.

The control unit of the digital camera 100 changes a photographing method in accordance with a photographing scene in a case where the shutter is to be turned on three times, such as a case where an image is photographed three times by patterns of different exposure values, a case where a focusing position is changed and an image is photographed three times, or the like. In a case where six images are formed by the post processing, image processings such as blurring processing, color filtering processing, trimming, and the like are executed in combination to an arbitrary one of the three RAW images and six images are finally generated.

Figure 6B:
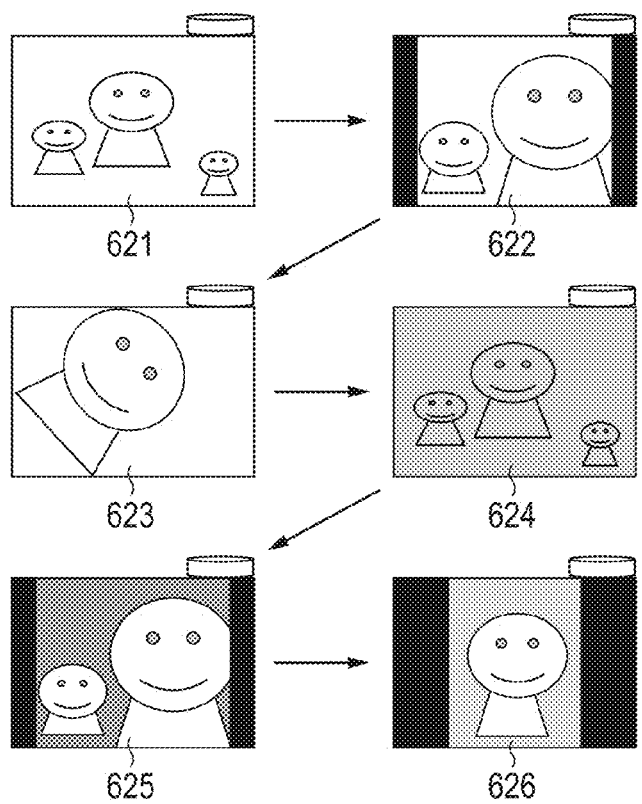

After that, S502 follows and the completed images are sequentially displayed with a full screen onto the display unit 28 of the digital camera 100. A screen transition at this time is illustrated in FIG. 6B.

A screen 621 displays an original image which is not subjected to any processing. After that, the images are sequentially generated and displayed in order of a screen 622 (one-to-one aspect trimming+enlargement cut-out), a screen 623 (enlargement+oblique cut-out), a screen 624 (filter effect processing), a screen 625 (image processing of the screen 622+filter effect processing), and a screen 626 (filter effect processing+enlargement vertical cut-out), then S503 follows.

Figure 6C:
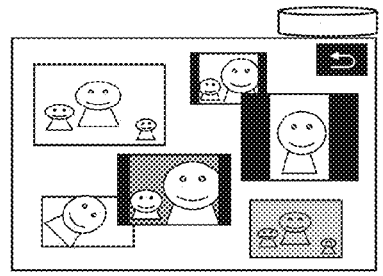
Figure 6D:
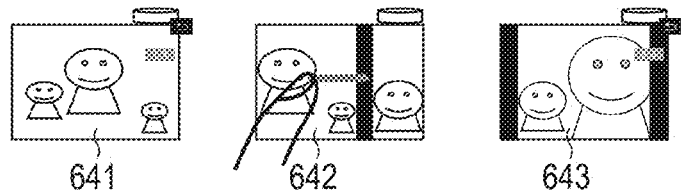

In S503, a rec review multi-display is performed so that the six generated images can be viewed at a time. This state is illustrated in FIG. 6C. In a case where the user wants to pick up and view any one of the images, if touching and pressing the image displayed on the display unit 28, the display mode is transited to a one-image single-display in S504. A state in the case of the one-image single-display is illustrated in FIG. 6D. In this single-display, by further executing the "pinch" operation, the image can be enlarged to be confirmed.

Although the screen is returned to the state of FIG. 6C by touching the "back" button at the upper right position on the screen, there is a usage case where the user wants to view the next image while keeping the current single-display. Therefore, in such a case, a state of a screen 641 is arranged to require a specific trace to be drawn to the touch panel. According to this method, the function assigned to such a trace is activated and the screen can be transited to the next image. A state where such a trace is drawn is shown in a screen 642. A state where the screen is transited to the next image is shown in a screen 643.

The specific trace will now be described.

Figure 7:
FIG. 7 is a diagram illustrating a list of functions assigned to specific traces.
Figure 7:
Figure 7:
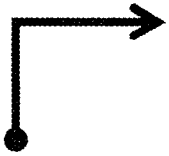
Figure 7:
Figure 7:
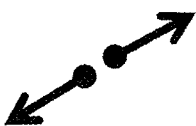

FIG. 7 is a diagram illustrating a list of functions assigned to the specific traces. The trace drawn on the screen 642 described with reference to "FIG. 6D" indicates a trace of a gesture B, which will be described hereinafter.

A gesture A indicates such an operation that a one-dimensional trace is drawn to the right. The function assigned to such a trace is an image feed to the previous image.

The gesture B indicates such an operation that a one-dimensional trace is drawn to the left. The function assigned to such a trace is an image feed to the next image.

A gesture C indicates such a two-dimensional trace that after a trace is drawn in the upper direction and subsequently drawn to the right. The function assigned to such a trace is "add to favorite".

A gesture D indicates such a multi-dimensional trace of two or more dimensions that a character "P" is written with a single stroke. The function assigned to such a trace is "give protection".

A gesture E indicates a trace of "pinch". The function assigned to such a trace is "enlarge image".

To complete the confirmation in S505, the display screen is returned to the screen of FIG. 6C and by pressing the "back" button at the upper right position on the screen of FIG. 6C, the screen is returned to the photographing standby screen and a series of flow is completed.

First Embodiment

In the first embodiment, a processing in the photographing mode of the digital camera 100 will be described.

Figure 8:
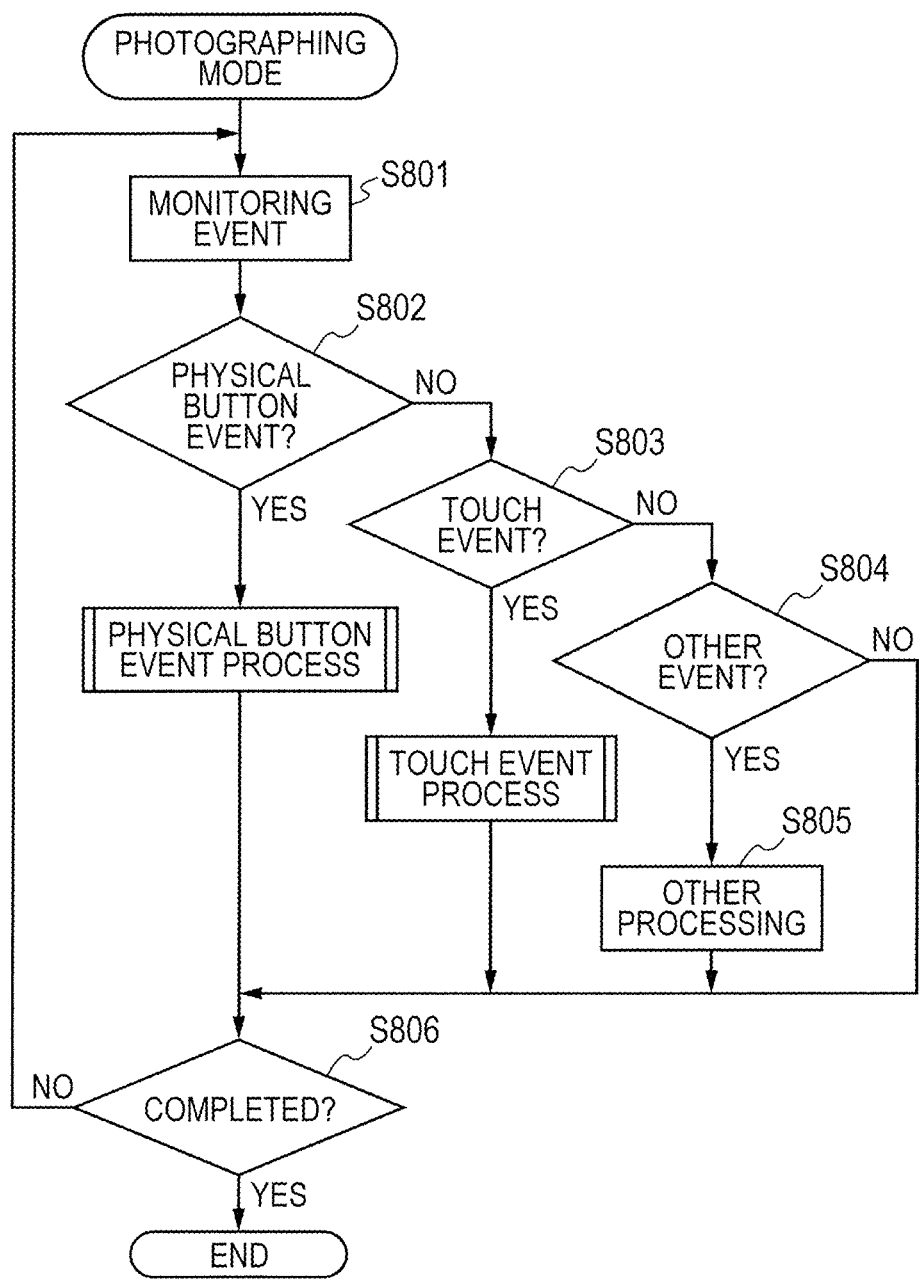
FIG. 8 is a flowchart illustrating a processing in a photographing mode of the digital camera according to the first embodiment of the invention.

FIG. 8 is a flowchart illustrating the processing in the photographing mode. This flowchart is realized by a method whereby the program recorded in the nonvolatile memory 56 is developed into the system memory 52 and the system control unit 50 executes it.

In S801, an event of the user operation is monitored, and S802 follows.

In S802, whether or not the event received in S801 is a physical button event is discriminated. If it is determined that the event is the physical button event, a physical button event process is executed. If it is determined that the event is not the physical button event, S803 follows. Note that "physical button event" mentioned here denotes an event which is executed when a hardware member is operated, for example, when the shutter button is pressed, a power button is pressed, or the like. The physical button event process will be described hereinafter.

In S803, whether or not the event received in S801 is a touch event is discriminated. If it is determined that the event is the touch event, a touch event process is executed. If it is determined that the event is not the touch event, S804 follows. The touch event process will be also described hereinafter.

In S804, whether or not the event is none of the physical button event and the touch event but is other event is discriminated. If it is determined that the event is the other event, S805 follows. If it is determined that the event is not the other event, S806 follows. In S805, other processing is executed. Note that "other processing" mentioned here denotes such a processing that an event showing whether or not the attitude of the camera is changed is received from the acceleration sensor 99 and the GUI display is inverted, or the like. The processing routine advances to S806. In S806, whether or not the photographing mode is completed is discriminated. If it is determined that the photographing mode is completed, the photographing mode process is completed. If the photographing mode is not completed, the processing routine is returned to S801 and the event is monitored.

Figure 9:
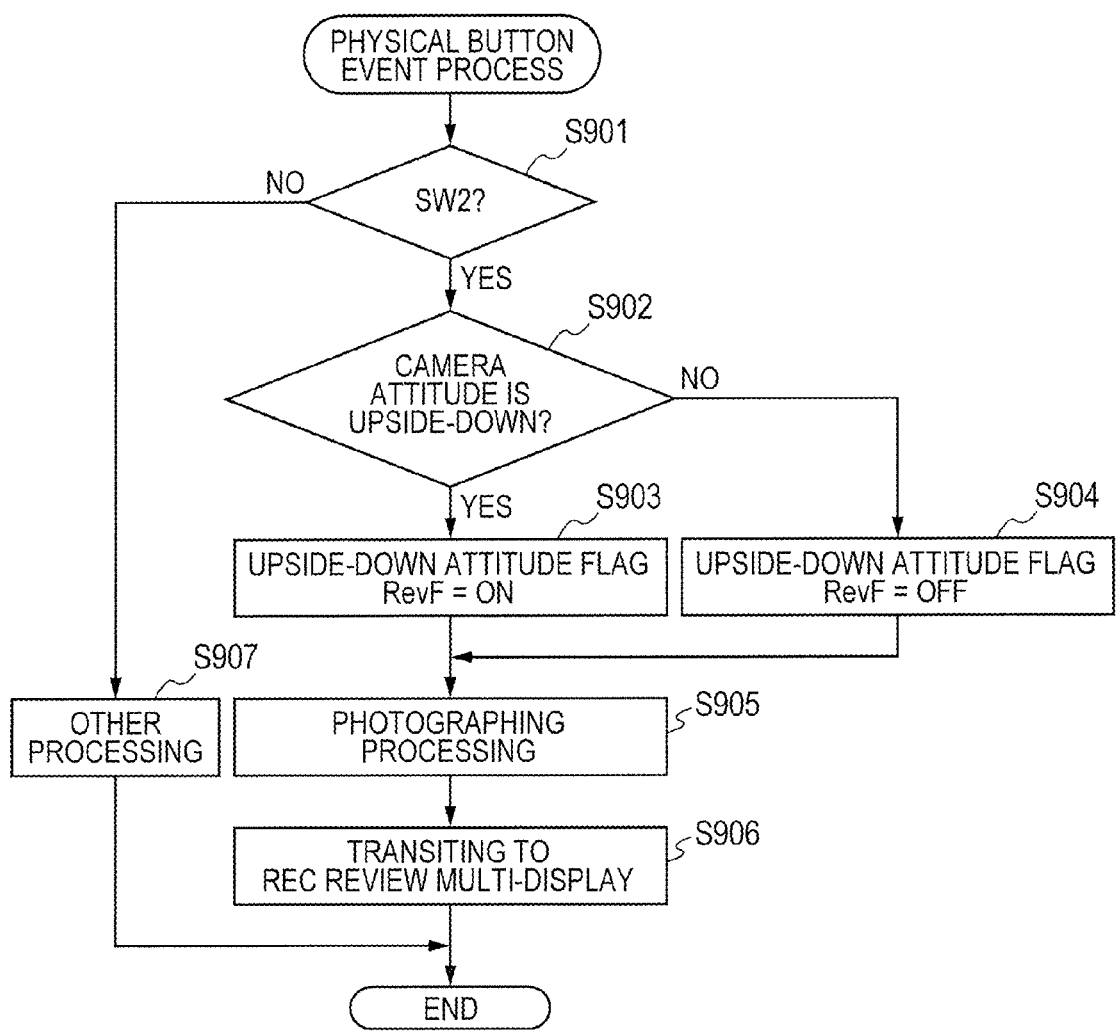
FIG. 9 is a flowchart illustrating a physical event process in the photographing mode of the digital camera according to the first embodiment of the invention.

FIG. 9 is a flowchart illustrating a procedure for the physical button event process in FIG. 8. This flowchart is realized by a method whereby the program recorded in the nonvolatile memory 56 is developed into the system memory 52 and the system control unit 50 executes it.

In S901, whether or not the event is a shutter button event is discriminated. If it is determined that the event is the shutter button event, S902 follows. If it is determined that the event is not the shutter button event, S907 follows.

Subsequently, in S902, whether or not the attitude of the camera at the time when the shutter button is pressed is upside-down is discriminated. The attitude of the camera is discriminated by checking a state of the acceleration sensor 99. In the embodiment, it is assumed that the case where the attitude of the camera is not upside-down is the first attitude and the case where the attitude of the camera is upside-down is the second attitude. If it is a case of upside-down, S903 follows. If it is not the case of upside-down, S904 follows.

In S903, a flag to manage camera attitude upside-down information is turned on and is written into the memory 32. The camera attitude upside-down information flag in this instance is called RevF (reverse flag). That is, RevF=ON is set. Then, S905 follows. In S904, RevF=OFF is set contrary to S903. Then, S905 follows.

In S905, the photographing processing is executed. After completion of the photographing processing, S906 follows and a rec review display is performed. In the present embodiment, it is assumed that an initial display of the rec review is started in a multi-display. The process of the physical button event is temporarily finished, the processing routine is returned to S801 in FIG. 8, and the apparatus enters an event standby state.

In the case where the above processing is realized in the foregoing multi-shot mode, it means that the operation processing to be performed a range from the photographing to the rec review multi-display (S501 to S503) is executed by the processings of S901⇒S902⇒S903 (S904)⇒ S905⇒S906. In S907, other processing is executed. Note that "other processing" mentioned here denotes an event other than the shutter button, that is, an event regarding settings prior to photographing such as a change in exposure or zoom position or the like. After completion of such a processing, the process of the physical button event is temporarily finished, the processing routine is returned to S801 in FIG. 8, and the apparatus enters an event standby state.

Figure 10:
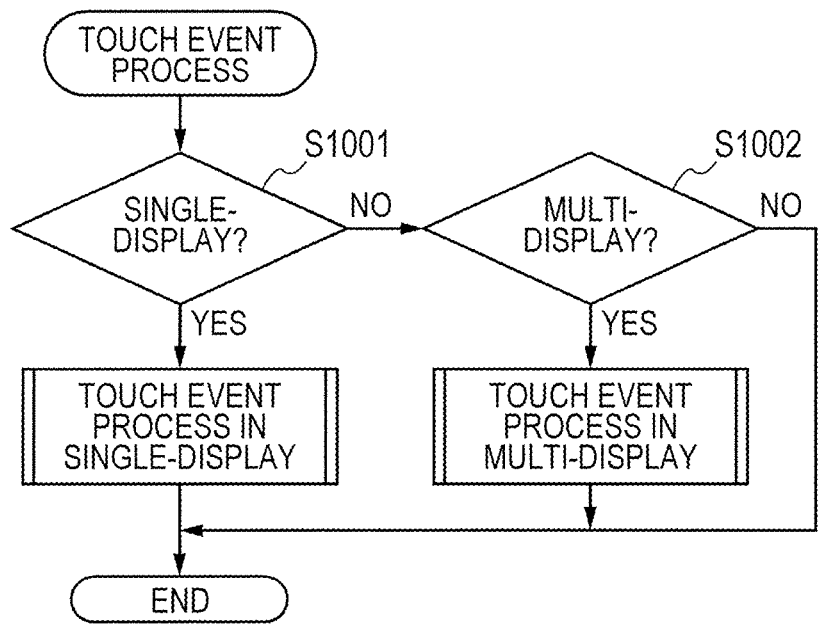
FIG. 10 is a flowchart illustrating a touch event process of the digital camera according to the first embodiment of the invention.

FIG. 10 is a flowchart illustrating the touch event process in FIG. 8. This flowchart is realized by a method whereby the program recorded in the nonvolatile memory 56 is developed into the system memory 52 and the system control unit 50 executes it.

In S1001, whether or not the state of the display unit 28 is the single-display (full-screen display of one image) is discriminated. Note that the case of the single-display denotes a case where one image is displayed in a rec review state after the photographing is performed in the foregoing multi-shot mode. The single-display in this case differs from the single-display in the reproduction mode. If the state of the display unit 28 is the single-display, the process routine advance to the touch event process in the single-display. If it is not the single-display, S1002 follows.

In S1002, whether or not the state of the display unit 28 is the multi-display (screen on which a list of a plurality of thumbnail images are displayed) is discriminated. If it is the multi-display, the touch event process in the multi-display is executed. If it is not the multi-display, the processing routine is finished.

Figure 11:
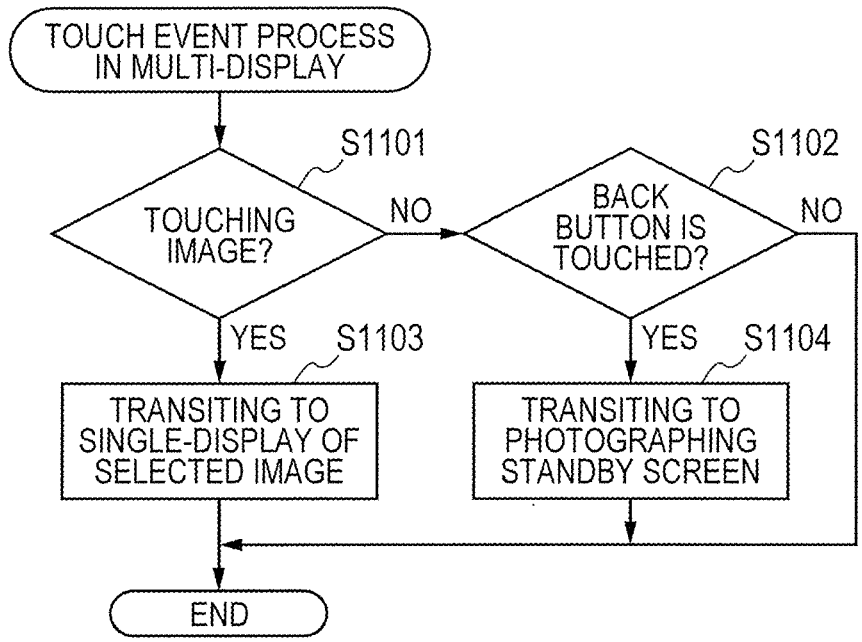
FIG. 11 is a flowchart illustrating the touch event process during the multi-display of the digital camera according to the first embodiment of the invention.

FIG. 11 is a flowchart illustrating the touch event process in the multi-display. This flowchart is realized by a method whereby the program recorded in the nonvolatile memory 56 is developed into the system memory 52 and the system control unit 50 executes it.

In S1101, whether or not the touch event is an event that a touch is provided onto the screen is discriminated. If it is determined that the event is the event that the touch is provided onto the screen, S1103 follows. If NO, S1102 follows.

In S1103, it is regarded that the touched screen is selected, the display mode is transited to the single-display. That is, such an operation flow (of S503 to S504) that the image on the screen is selected in the rec-review multi-display (FIG. 6C) after completion of the foregoing multi-shop mode photographing and the display mode is set to the single-display (FIG. 6D) means that it is executed by the processing flow of S1101⇒S1103.

In S1102, whether or not the "back" button is touched is discriminated. If it is determined that the "back" button is touched, S1104 follows. If NO, nothing is performed to complete the processing routine is completed.

In S1104, the review-display is finished and the display screen is returned to the photographing standby screen. That is, such an operation flow that the rec review after completion of the foregoing multi-shop mode photographing is finished (end from S505) means that it is executed by the processing flow of S1102⇒S1104.

Figure 12:
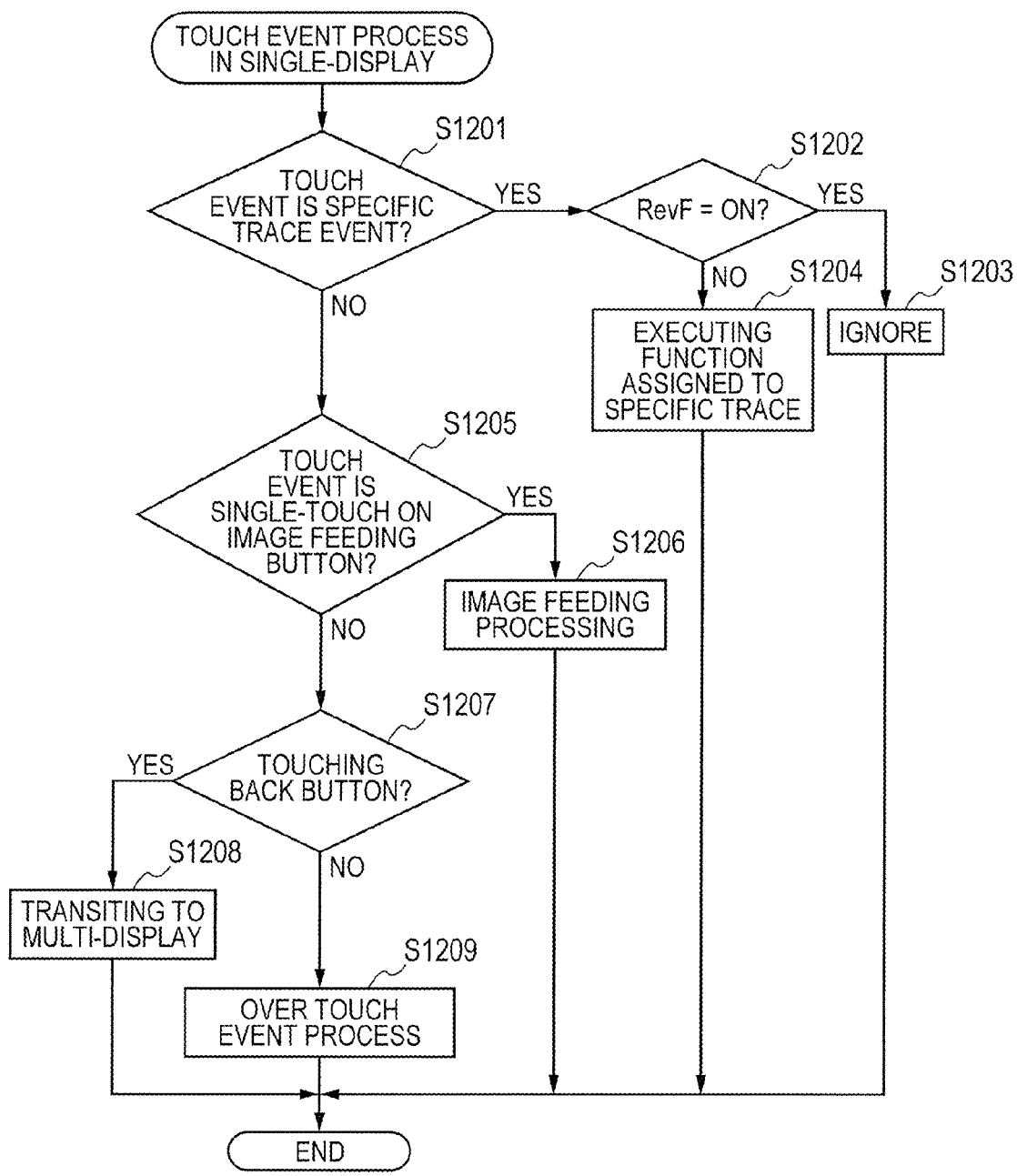
FIG. 12 is a flowchart illustrating the touch event process during the single-display of the digital camera.

FIG. 12 is a flowchart illustrating the touch event process in the single-display. This flowchart is realized by a method whereby the program recorded in the nonvolatile memory 56 is developed into the system memory 52 and the system control unit 50 executes it.

In S1201, whether or not the touch event is a specific trace event is discriminated. If it is determined that the touch event is the specific trace event, S1202 follows. If it is determined that the touch event is not the specific trace event, S1205 follows. It is assumed that "specific trace event" mentioned here denotes the foregoing gestures A to D.

In S1202, whether or not RevF=ON is discriminated. If it is ON, S1203 follows. If it is OFF, S1204 follows.

In S1203, the foregoing specific trace event is ignored. That is, for example, even if the gesture B is performed, the image feed to next is not performed. On the contrary, in S1204, the function assigned to the specific trace (that is, the image feed to next ("view next image"), which is a function assigned to the gesture B) is executed.

Figure 13A:
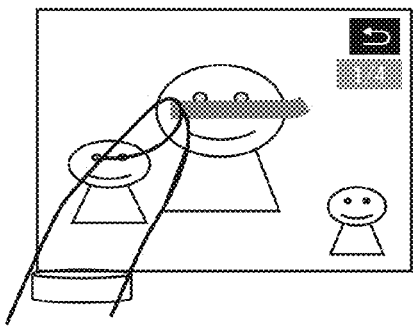
FIGS. 13A, 13B, 13C, 13D, 13E, 13F and 13G are diagrams illustrating display units in an upside-down attitude or a normal position attitude.

In other words, the description here is applied to the case where the user tries to perform the image feed in the state of the single-display (S504 in FIG. 5) of the multi-shot rec-review mentioned above. That is, the processing of S1203 denotes such an operation that the multi-shot photographing is performed in the upside-down attitude state and, at the time of rec review, the image feed to next is inhibited by the gesture operation (operation drawing the specific touch trace) (refer to FIG. 13A).

On the contrary, the processing of S1204 denotes such an operation that the multi-shot photographing is performed in the normal position state and, at the time of rec review, the image feed to next by the gesture operation is permitted (refer to the screen 642). As mentioned above, there is such an advantage that in dependence on the camera attitude, by restricting the functions assigned to the specific traces, it is useful to prevent the erroneous operation, and a risk of a camera drop caused by executing the unfamiliar operation or the like can be reduced.

As such a specific trace, a trace such as a relation between the gesture A (previous image feed) and the gesture B (next image feed) can be considered. That is, it is possible to construct in such a manner that in the case where one directional component of a trace is a trace under such a condition that the trace is moved by a predetermined distance or longer and also moved by a predetermined distance or longer in the opposite direction, a different function is assigned.

Figure 13B:
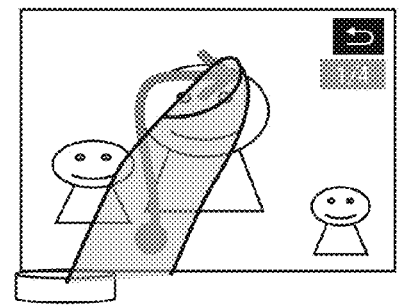

This is because in such a trace requires an operation to be performed while watching the camera, particularly, it is liable that the erroneous operation is performed in the case where the camera is operated in the rec review at the time of the high-angle shot, and there is a risk of drop in the case of a camera in which a grip portion 150 is not tightly formed. Although the present embodiment is described with respect to the gesture B as an example, also in a case where the function assigned to the two-dimensional trace like a gesture C is executed, the functions may be restricted since it is difficult to operate when the camera attitude is upside-down (refer to FIG. 13B).

Figure 13C:
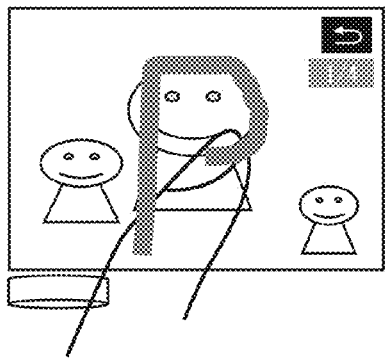
Figure 13D:
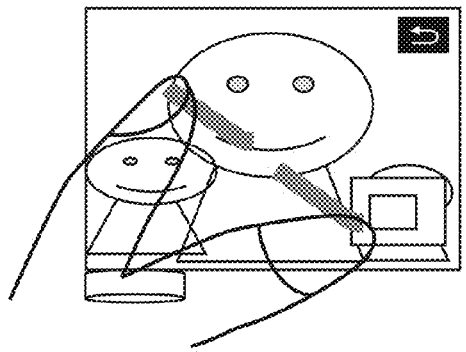

Also in the case of such an example in which a character is written instead of a trace and the function is activated like a gesture D, the function may be restricted since it is difficult to operate when the camera attitude is upside-down (refer to FIG. 13C). However, in the case of a trace of a pinch like a gesture E, the direction of the touch trace to the camera is not concerned since the operation is based only on a change in distance between the two touched points. Therefore, even if the user does not operate while watching the screen, the trace of the pinch is liable to be recognized in accordance with intention of the user, and the risk of the erroneous operation or camera drop is small. Therefore, in this case, even if the camera attitude is upside-down, the function may be executed (refer to FIG. 13D).

In S1205, whether or not the touch event is a single-touch operation on the "image-feed" button is discriminated. If the touch event is the single-touch operation on the "image-feed" button, S1206 follows. If NO, S1207 follows.

In S1206, the image feeding processing is executed. That is, the image feeding operation by the image-feed button like S1206 is a function as an alternative operation of the gesture A or B. The image feed in S1206 can be executed irrespective of the camera attitude. This is because the operation of the image feed by the single-touch is simpler than the dragging operation like a gesture B, and even in the upside-down attitude, the risk of the erroneous operation or camera drop is smaller.

Figure 13E:
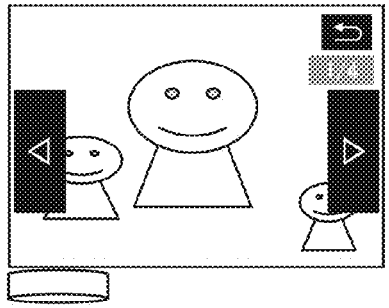

However, in the case of an image reproducing apparatus having the touch panel, the image feeding unit generally performs the dragging operation like a gesture A or B. Thus, if a clear instruction is provided by a GUI guidance or the like, there is a possibility that the dragging operation happens to be executed in the state of the upside-down attitude. Therefore, it is also possible to use such a unit that, as illustrated in FIG. 13E, in the case of the rec-review single-display in which an object image is photographed by holding the camera attitude upside-down, the "image-feed" button is always displayed, a single-touch area is clarified, and the operation by the button is guided.

Figure 13F:
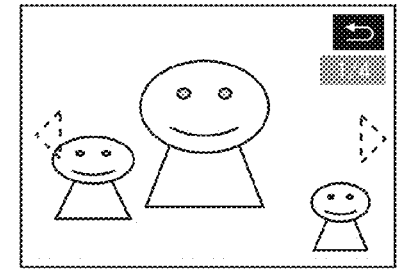

In the case where an object image is photographed by holding the camera attitude at the normal position and the rec-review single-reproduction is performed as it is in this attitude, such an operation that the "image-feed" button is always displayed is not a desirable method because an image viewing area is small in a small display like mobile equipment. Therefore, since a risk is small even in the image feed by the general dragging operation, it is also possible to construct in such a manner that, as illustrated in FIG. 13F, the button is not always displayed but only when such an area is touched, the image feed is activated (such an image that the "image-feed" button is transparent).

Figure 13G:
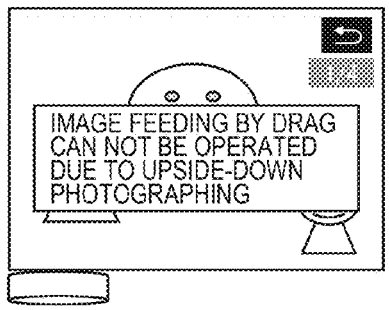

In the case of the rec-review single-display in which an object image is photographed by holding the camera attitude upside-down, it is desirable to restrict the execution of the function assigned to the specific trace like a gesture B. For this purpose, when the display mode enters the rec-review single-display (in S1103), a message to inhibit the operation may be displayed as a guidance for a predetermined time (refer to FIG. 13G).

In S1207, whether or not the "back" button on the display screen is touched in the single-display is discriminated. If the "back" button is touched, S1208 follows. If it is not touched, S1209 follows since the touch event is another touch event.

In S1208, the display mode is transited to the multi-display. That is, an operation flow from the one-image single-display of the rec review after the multi-shot photographing mentioned above to the completion of the confirmation (S504 to S505) means that it is executed by the processing flow of S1207⇒S1208. In S1209, other touch event process is executed. Note that "other processing" mentioned here denotes an image enlargement caused by performing the double-touch operation, or the like.

Second Embodiment

The second embodiment will now be described with respect to the processing in the reproduction mode of the digital camera 100.

Figure 14:
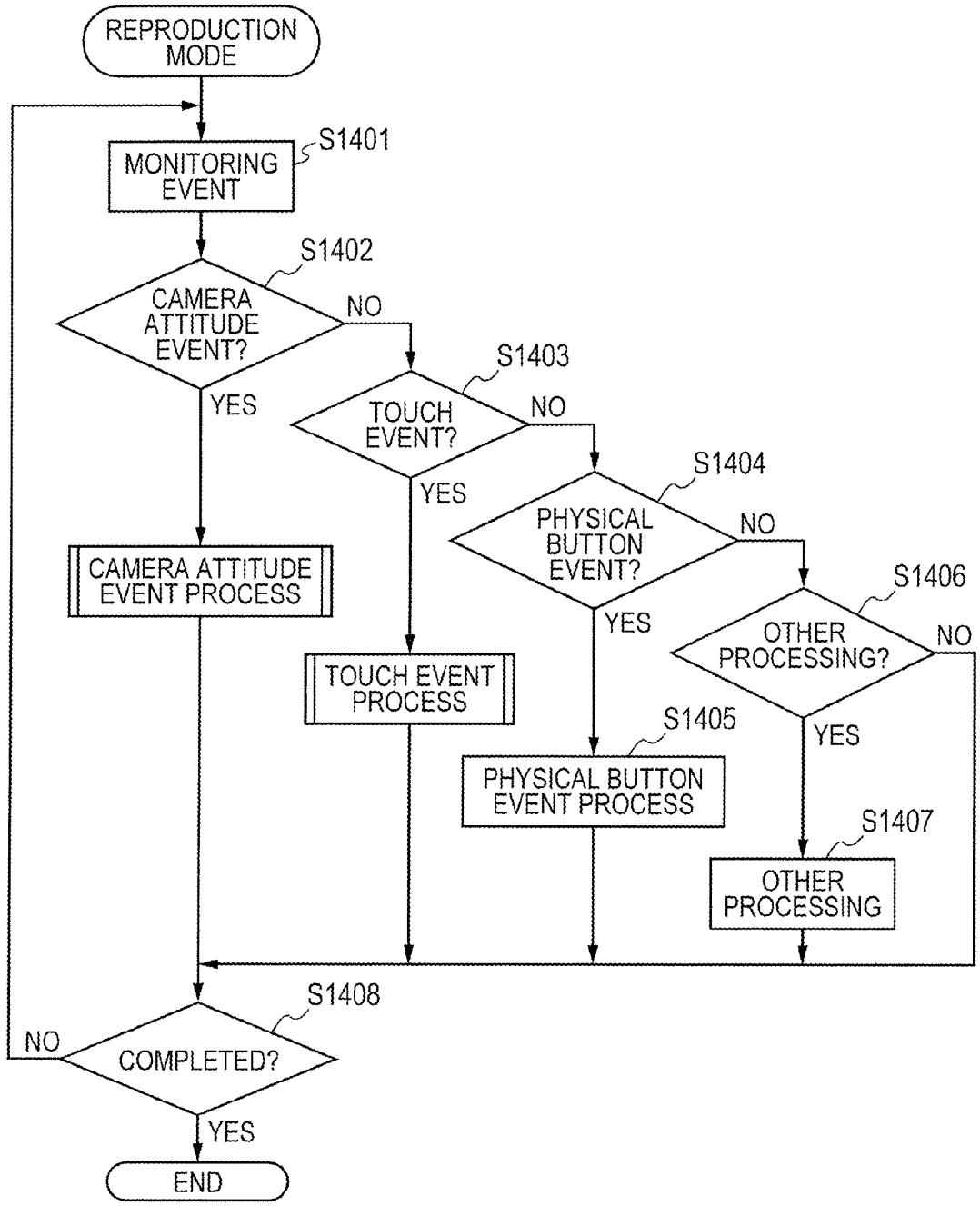
FIG. 14 is a flowchart illustrating a processing in a reproduction mode of a digital camera according to the second embodiment of the invention.

FIG. 14 is a flowchart illustrating the processing in the reproduction mode. This flowchart is realized by a method whereby the program recorded in the nonvolatile memory 56 is developed into the system memory 52 and the system control unit 50 executes it.

In S1401, an event of the user operation is monitored, and S1402 follows. In S1402, whether or not the event received in S1401 is a camera attitude event is discriminated. The camera attitude event is an event notified from the acceleration sensor 99.

If it is determined that the event is the camera attitude event, the process routine advance to a camera attitude event process. If it is determined that the event is not the camera attitude event, S1403 follows.

In S1403, whether or not the event received in S1401 is a touch event is discriminated. If it is determined that the event is the touch event, the process routine advance to a touch event process. If it is determined that the event is not the touch event, S1404 follows.

In S1404, whether or not the event received in S1401 is a physical button event is discriminated. If it is determined that the event is the physical button event, S1405 follows. If it is determined that the event is not the physical button event, S1406 follows. Note that "physical button event" mentioned here denotes, for example, such an operation that when a "delete" button of an image is pressed, the image is deleted, or the like. Then, S1408 follows.

In S1406, whether or not the event received in S1401 is other event is discriminated. If it is determined that the event is the other event, S1407 follows and other event processing is executed. If NO, S1408 follows. Note that "other event" mentioned here denotes such an operation that a USB connection is made, or the like. Then, S1408 follows.

In S1408, whether or not the reproduction mode is completed is discriminated. If it is completed, the reproduction mode is completed. If it is not completed, the processing routine is returned to S1401 and the event is monitored.

Figure 16:
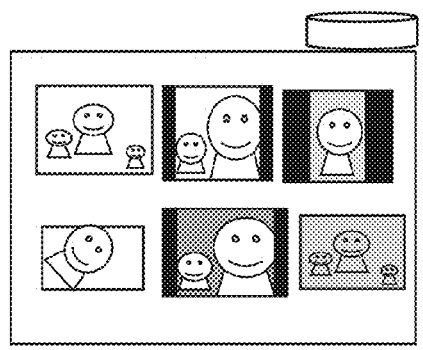
FIG. 16 is a diagram illustrating a display unit in a normal position attitude.

Although the touch event process in the second embodiment is similar to the touch event process in the first embodiment mentioned above, it is assumed that the multi-display of the reproduction mode is performed as illustrated in FIG. 16 and the "back" button at the upper right position on the display screen is not displayed.

Figure 15:
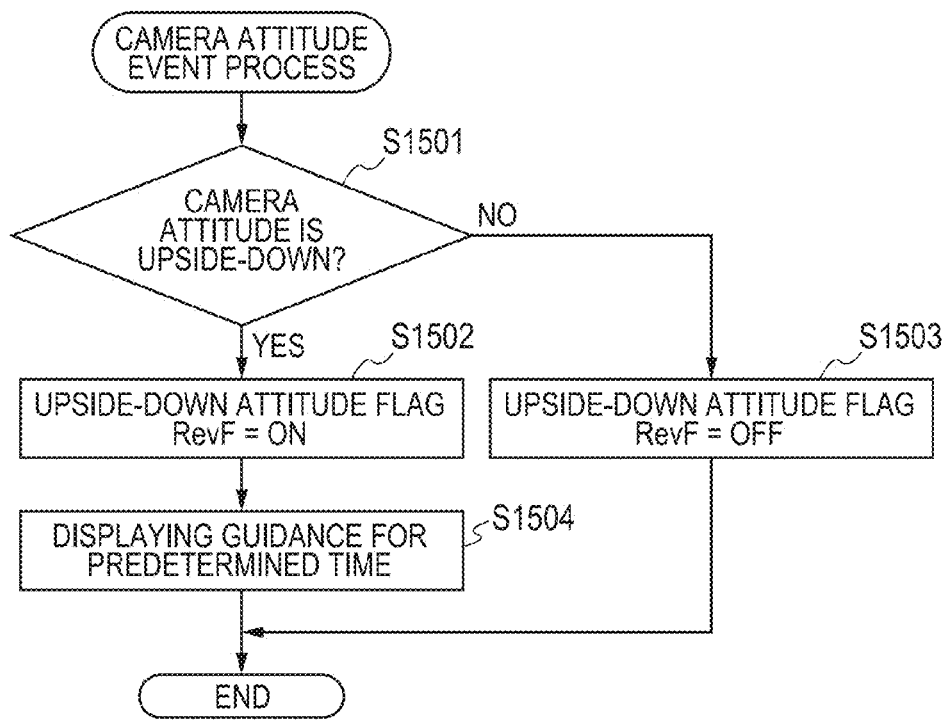
FIG. 15 is a flowchart illustrating a camera attitude event process of the digital camera according to the second embodiment of the invention.

FIG. 15 is a flowchart illustrating the camera attitude event process. This flowchart is realized by a method whereby the program recorded in the nonvolatile memory 56 is developed into the system memory 52 and the system control unit 50 executes it.

In S1501, whether or not the information notified from the acceleration sensor 99 is "camera attitude is upside-down" is discriminated. If the camera attitude is upside-down, S1502 follows. If the camera attitude is not upside-down but is held at the normal position, S1503 follows.

In S1502, RevF is set to ON, and S1504 follows. In S1503, RevF is set to OFF. In S1504, since the camera attitude is upside-down, a guidance to inhibit the operation when the camera is in the reproduction mode is displayed to the display unit. That is, in the case of the reproduction mode (image browsing mode), the camera attitude is always monitored.

On the contrary, in the case of the photographing mode like a first embodiment, the camera attitude is monitored only once when an object image is photographed. The reason why the timing for monitoring the camera attitude upon photographing and the timing for monitoring the camera attitude upon reproduction are made different as mentioned above is as follows. At the time of the rec review after the photographing, the camera attitude is not frequently moved during the review. On the other hand, at the time of the reproduction, when a vertical-aspect image is watched, there is a case where the camera attitude is moved by vertically displaying the camera. By always monitoring the camera attitude, a better use efficiency is obtained.

As an example, in a usage case of the high-angle shot, such an operation that an object image is photographed by holding the camera upside-down and, at the time of the rec review, the camera is returned to the normal position is an operation in a rare case when presuming a case where at the time of the image confirmation after the photographing, the image is confirmed while holding the camera in such a manner that that an image can be soon continuously photographed. Therefore, at the time of the rec review, it is better to continuously use the camera by retaining a value of RevF obtained before the photographing without referring to RevF. By using such a method, at the time of the rec review, there is no need to move a task for checking the camera attitude, and a deterioration in performance due to a wasteful processing can be prevented.

Figure 17A:
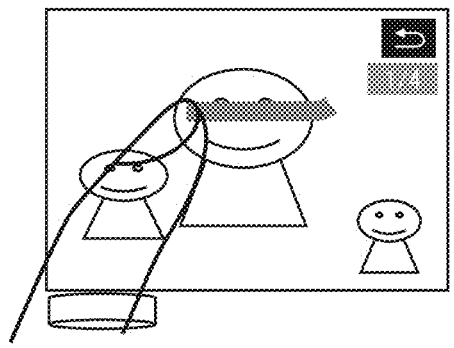
FIGS. 17A, 17B, 17C, and 17D are diagrams illustrating an upside-down attitude or a normal position attitude.
Figure 17B:
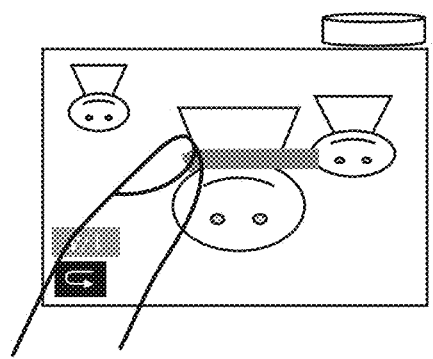

For example, FIG. 17A illustrates a case where the function is not activated in the case where an object image is photographed by holding the camera upside-down and the operation of the gesture B is executed in an upside-down state while keeping the rec-review single-display. FIG. 17B illustrates a case where the camera attitude is returned to the normal position while keeping the rec-review single-display after FIG. 17A. Also in this case, since a judgment is also made based on the attitude before the photographing, the operation of the gesture B is not executed.

Figure 17C:
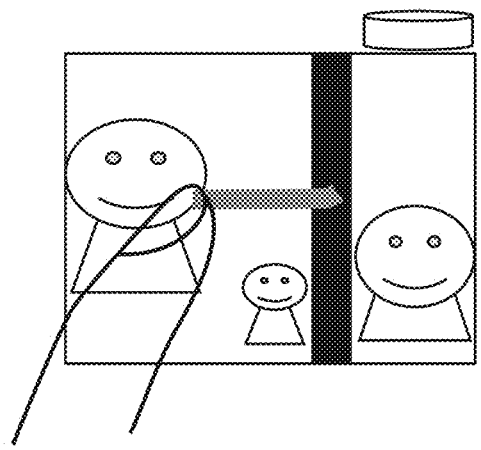
Figure 17D:
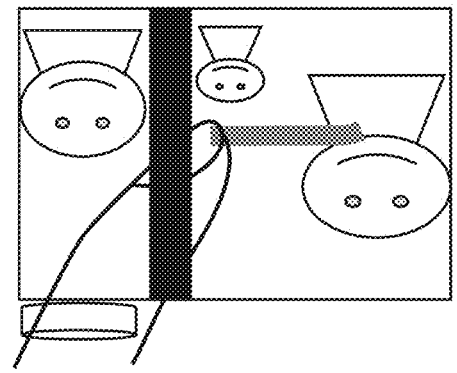

On the contrary, FIG. 17C illustrates a case where the function is activated in the case where an object image is photographed in the camera attitude at the normal position and the operation of the gesture B is executed in the rec-review single-display. FIG. 17D illustrates a case where the camera attitude is set to be upside-down while keeping the rec-review single-display after FIG. 17C. At this time, since a judgment is made based on the attitude before the photographing, the operation of the gesture B is executed.

As mentioned above, at the time of the photographing, by controlling whether the gesture operation is permitted or inhibited in the state before the photographing, a deterioration in performance due to a wasteful processing can be prevented.

As mentioned above, according to the foregoing embodiment, since the specific touch gesture operation is not accepted in the camera upside-down state and it is recommended to execute the fundamental operation at the normal position, a drop of the camera and an erroneous operation can be prevented.

The foregoing control may be performed by one hardware or the whole apparatus may be controlled by sharing the processing by a plurality of kinds of hardware.

Although the present invention has been described in detail on the basis of the exemplary embodiments, the invention is not limited to those specific embodiments but various kinds of forms within a range without departing from the gist of the invention are also incorporated in the invention. Further, each of the foregoing embodiments merely shows an embodiment of the invention and those embodiments may be properly combined.

Although the above embodiments have been described with respect to the case where the invention is applied to the image pickup apparatus as an example, the invention is not limited to such an example but can be also applied to any apparatus having a touch panel. For example, the invention can be also applied to a personal computer, a PDA, a portable phone terminal, a portable image viewer, an electronic book reader, or the like.

The invention is also realized by executing the following processings. That is, software (program) for realizing the functions of the embodiments mentioned above is supplied to a system or apparatus through a network or various kinds of storage media, a computer (or a CPU, MPU, or the like) of the system or apparatus reads out a program code of the program, and executes it. In this case, the program and a computer-readable storage medium in which the program is stored construct the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-285994 filed on Dec. 27, 2012, which is hereby incorporated by reference herein in its entirety.

What is claimed is:

1. An electronic apparatus comprising:
an attitude detection unit;
a touch detection unit; and
a control unit configured to control in such a manner that
in a ease where an attitude detected by the attitude detection unit is a first attitude, if a trace of a touched position detected by the touch detection unit satisfies a specific condition, a specific function corresponding to the detected trace is executed, and
in a case where the attitude detected by the attitude detection unit is a second attitude upside-down turned from the first attitude, the specific function corresponding to a trace of a touched position detected by the touch detection unit is not executed.

2. The apparatus according to claim 1, wherein the specific condition is that one directional component of the trace is moved by a predetermined distance or longer, and in a case where the trace is moved by a predetermined distance or longer in an opposite direction, a different function is assigned.

3. The apparatus according to claim 2, wherein the trace which satisfies the specific condition is a trace based on such a condition that it is a trace of two or more dimensions.

4. The apparatus according to claim 3, wherein the specific trace is a trace for depicting a character.

5. The apparatus according to claim 1, wherein the trace which satisfies the specific condition does not include a trace of a pinch, and wherein the pinch is an operation of touching a plurality of positions simultaneously, and narrowing or widening an interval between the plurality of positions, irrelevant to moving directions of the plurality of positions.

6. The apparatus according to claim 5,
wherein the control unit configured
(a) in a case where an attitude detected by the attitude detection unit is the first attitude, to execute the specific function when the touch detection unit detects a trace which satisfies the specific condition,
(b) in a case where an attitude detected by the attitude detection unit is the first attitude, to execute an enlargement control of the displayed image or a reduction control of the displayed image when the touch detection unit detects a trace of the pinch,
(c) in a case where an attitude detected by the attitude detection unit is the second attitude, the specific function corresponding to any trace of a touched position detected by the touch detection unit is not executed,
(d) in a case where an attitude detected by the attitude detection unit is the second attitude, to execute the enlargement control or the reduction control when the touch detection unit detects a trace of the pinch.

7. The apparatus according to claim 1, wherein the control unit controls in such that in a case where the attitude detected by the attitude detection unit is the second attitude, a button arranged to activate the specific function is displayed to a display unit.

8. The apparatus according to claim 1, wherein the control unit controls in such that in a case where the attitude detected by the attitude detection unit is the second attitude, a guidance indicating that the specific function corresponding to the trace of a touched position detected by the touch detection unit is not executed when the attitude is the second attitude is displayed to a display unit.

9. The apparatus according to claim 1, wherein at the time of a photographing, the attitude detection unit detects the attitude, and at the time of an image confirmation after the photographing, the attitude detection unit does not detect the attitude but retains information detected at the time of the photographing.

10. The apparatus according to claim 1, wherein the attitude detection unit executes an attitude detection processing for a period of time from an activation of the electronic apparatus to completion thereof.

11. The apparatus according to claim 1, further comprising a grip portion.

12. The apparatus according to claim 1, wherein the specific function is a function of changing from an image displayed on the display unit into another image.

13. A control method of an electronic apparatus, comprising:
an attitude detection step;
a touch detection step; and a control step of controlling in such a manner that in a case where an attitude detected in the attitude detection step is a first attitude, if a trace of a touched position detected in the touch detection step satisfies a specific condition, a specific function corresponding to the detected trace is executed, and in a case where the attitude detected in the attitude detection step is a second attitude upside-down turned from the first attitude, the specific function corresponding to a trace of a touched position detected in the touch detection step is not executed.

14. A non-transitory computer-readable storage medium storing a program for causing a computer to execute a control method of an electronic apparatus, the control method comprising:

an attitude detection step;

a touch detection step; and a control step of controlling in such a manner that in a case where an attitude detected in the attitude detection step is a first attitude, if a trace of a touched position detected in the touch detection step satisfies a specific condition, a specific function corresponding to the detected trace is executed, and in a case where the attitude detected in the attitude detection step is a second attitude upside-down turned from the first attitude, the specific function corresponding to a trace of a touched position detected in the touch detection step is not executed.

* * * * *